US012737807B2

(12) United States Patent
Khanna et al.

(10) Patent No.: US 12,737,807 B2
(45) **Date of Patent: *Sep. 15, 2026**

(54) TOKENIZING CREDIT RISK USING A DISTRIBUTED LEDGER

(71) Applicant: CITADEL ENTERPRISE IP HOLDINGS LP, Miami, FL (US)

(72) Inventors: Rock Khanna, Miami, FL (US); David Inggs, Miami, FL (US); Matt Emerson, Miami, FL (US)

(73) Assignee: CITADEL ENTERPRISE IP HOLDINGS LP, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/047,207

(22) Filed: Feb. 6, 2025

(65) Prior Publication Data

US 2025/0182202 A1 Jun. 5, 2025

Related U.S. Application Data

(63) Continuation of application No. 18/112,756, filed on Feb. 22, 2023, now Pat. No. 12,248,983.

(51) Int. Cl.
*G06Q 40/03* (2023.01)
*G06Q 40/04* (2012.01)

(52) U.S. Cl.
CPC ............. *G06Q 40/03* (2023.01); *G06Q 40/04* (2013.01); *G06Q 2220/00* (2013.01)

(58) Field of Classification Search
CPC ........ G06Q 40/04; G06Q 40/03; G06Q 40/06; G06Q 2220/00
See application file for complete search history.

(56) References Cited

U.S. PATENT DOCUMENTS 10,095,888 B1 10/2018 Lee et al.
11,438,140 B2 9/2022 Shi et al.
11,823,180 B1 * 11/2023 Trinh ................ G06Q 20/3674
2002/0007334 A1 1/2002 Dicks et al.
2018/0006831 A1 * 1/2018 Toll ........................... H04L 9/34
2020/0279328 A1 * 9/2020 Zhiri .................. G06Q 20/3678
(Continued)

OTHER PUBLICATIONS

Henry F. Minnerop, The Role and Regulation of Clearing Brokers—Revisited, 75 Bus. Law. 2201 (2020) (Year: 2020).*
(Continued)

*Primary Examiner* — Asha Puttaiah
(74) *Attorney, Agent, or Firm* — MARSHALL, GERSTEIN & BORUN LLP

(57) ABSTRACT

To manage credit risk using a distributed ledger, a computing device determines a line of credit to provide from a clearing broker to an investment manager. The computing device mints a token representing the line of credit from the clearing broker by interacting with a distributed ledger maintained by a plurality of participants in a distributed ledger network, and generates a transaction including a transfer of the token representing the line of credit from the clearing broker to the investment manager. The transaction is stored in the distributed ledger and includes an indication of the clearing broker providing the line of credit. Then the computing device transmits the transaction to at least one other participant in the distributed ledger network.

18 Claims, 8 Drawing Sheets

(56) References Cited

U.S. PATENT DOCUMENTS

| | | | | |
|---|---|---|---|---|
| 2021/0073913 A1* | 3/2021 | Ingargiola | ............... | H04L 63/12 |
| 2023/0186301 A1* | 6/2023 | Enneking | ............... | G06Q 20/02 |
| | | | | 705/44 |

OTHER PUBLICATIONS

Office Action for U.S. Appl. No. 18/112,756, dated Aug. 3, 2023.
Bosun Adebaki, “Microfinance and alternative data meets the world of Blockchain”, Feb. 5, 2019 hereinafter referred to as Adebaki Year: 2019).
Office Action for U.S. Appl. No. 18/112,756, dated Nov. 20, 2023.
Office Action for U.S. Appl. No. 18/112,756, dated May 23, 2024.
Finra, “ Distributed Ledger Technology: Implications of Blockchain for the Securities Industry” (2017) (https://www.finra.org/sites/default/files/FINRA_Blockchain_Report.pdf) (Year: 2017.).

* cited by examiner

TOKENIZING CREDIT RISK USING A DISTRIBUTED LEDGER

CROSS-REFERENCE TO RELATED APPLICATIONS

This application is a continuation of U.S. patent application Ser. No. 18/112,756 entitled "Tokenized Credit Risk Using a Distributed Ledger," filed on Feb. 22, 2023, the entire contents of which is hereby expressly incorporated herein by reference.

TECHNICAL FIELD

The present disclosure relates generally to systems and methods for managing credit risk, and more particularly to the use of distributed ledgers to tokenize lines of credit to reduce the volume of unplanned trade cancellations and provide additional transparency into credit risk for clearing brokers, executing brokers, and investment managers.

BACKGROUND

Typically, when an investment manager enters into a trade of an asset, the investment manager requests an executing broker to execute the trade on behalf of the investment manager. The executing broker places a fulfillment order on behalf of the investment manager. A clearing broker, which has an existing clearing agreement with the investment manager, settles the trade into an account for the investment manager once the trade is determined to be in compliance with the clearing agreement. The rights and obligations of the clearing broker, executing broker, and investment manager may be governed by a give-up agreement entered into by each of the parties.

Under the clearing agreement, a clearing broker may refuse to settle the trade when the clearing broker's counterparty risk to the investment manager is too high. The counterparty risk may be heightened in a distressed market. If the clearing broker refuses to settle the trade, under the give-up agreement, the executing broker typically has the option of resubmitting the trade to the same or a different clearing broker, settling the trade itself, or terminating the trade.

In these scenarios, the executing broker is vulnerable to fulfilling trades that do not get settled due to lack of transparency between the clearing broker and the executing broker. Cancelling these trades risks an economic loss for the investment manager and executing broker who do not have a simple way to know ahead of time whether the clearing broker will settle the trade.

SUMMARY

Techniques, systems, apparatuses, components, devices, and methods are disclosed for a digital token that represents a line of credit provided by a clearing broker to an investment manager. The line of credit may have a particular credit amount (e.g., $100), a particular duration (e.g., a month), and/or other terms and conditions. The clearing broker may mint the digital token via a distributed ledger (e.g., blockchain) and may indicate the terms of the conditions of the line of credit. Then the clearing broker may transmit a transaction to the distributed ledger transferring the token to the investment manager. When the investment manager requests to trade an asset, the investment manager can provide the token as proof of the line of credit from the clearing broker so that the trade is settled by the clearing broker without the risk of the trade being canceled.

In this manner, the tokenized credit risk system maintains a trusted, secure, and immutable record of the lines of credit provided by clearing brokers. The tokenized credit risk system allows for increased transparency so that each of the clearing brokers, executing brokers, and investment managers monitoring the distributed ledger can view the lines of credit being provided to each party and the party providing the lines of credit. Accordingly, investment managers and/or executing brokers do not need to enter into trades without knowing whether they will be settled. Additionally, the transparency allows each of the parties to be aware of the total outstanding credit being provided by a particular clearing broker.

Moreover, by utilizing a distributed ledger, the tokenized credit risk system reduces the risk of fraud. Parties monitoring the distributed ledger can be confident that the party minting token is who they say they are, because the consensus rules of the distributed ledger may include that the originator of a change (e.g., minting a new token) supply a proof-of-identity such that only approved entities may originate changes to the distributed ledger. In this manner, it is nearly impossible for parties to fraudulently obtain a line of credit from a party falsely claiming that they are the clearing broker. Also, the clearing broker cannot fraudulently claim that they did not issue the line of credit or unilaterally delete the line of credit. Therefore, when a party receives a token representing a line of credit from a particular clearing broker, the party has indisputable proof of the line of credit from the clearing broker. The party can execute trades with the knowledge that the clearing broker will settle them as long as the cost of the trades do not exceed the line of credit and/or other terms and conditions of the line of credit are satisfied.

One example embodiment of the techniques of this disclosure is a method for managing credit risk using a distributed ledger maintained by a plurality of participants. The method includes determining a line of credit to provide from a clearing broker to an investment manager, and minting a token representing the line of credit from the clearing broker by interacting with a distributed ledger maintained by a plurality of participants in a distributed ledger network. The method also includes generating a transaction including a transfer of the token representing the line of credit from the clearing broker to the investment manager, where the transaction is stored in the distributed ledger. Additionally, the method includes transmitting, to at least one other participant in the distributed ledger network, the transaction including an indication of the clearing broker providing the line of credit.

Another example embodiment of the techniques of this disclosure is a method for verifying credit of an investment manager using a distributed ledger maintained by a plurality of participants. The method includes receiving, at an executing broker from an investment manager, a request to execute a trade of an asset, and monitoring a distributed ledger maintained by a plurality of participants in a distributed ledger network for a token representing a line of credit provided by a clearing broker to the investment manager. In response to identifying the token representing the line of credit provided by the clearing broker to the investment manager, the method includes placing a fulfillment order for the trade by the investment manager.

Yet another example embodiments of the techniques of this disclosure is a computing device for managing credit risk using a distributed ledger maintained by a plurality of participants. The computing device includes one or more processors and a non-transitory computer-readable medium coupled to the one or more processors and storing instructions thereon. When executed by the one or more processors, the instructions cause the computing device to determine a line of credit to provide from a clearing broker to an investment manager, and mint a token representing the line of credit from the clearing broker by interacting with a distributed ledger maintained by a plurality of participants in a distributed ledger network. The instructions further cause the computing device to generate a transaction including a transfer of the token representing the line of credit from the clearing broker to the investment manager, where the transaction is stored in the distributed ledger, and transmit, to at least one other participant in the distributed ledger network, the transaction including an indication of the clearing broker providing the line of credit.

DETAILED DESCRIPTION

Figure 1:
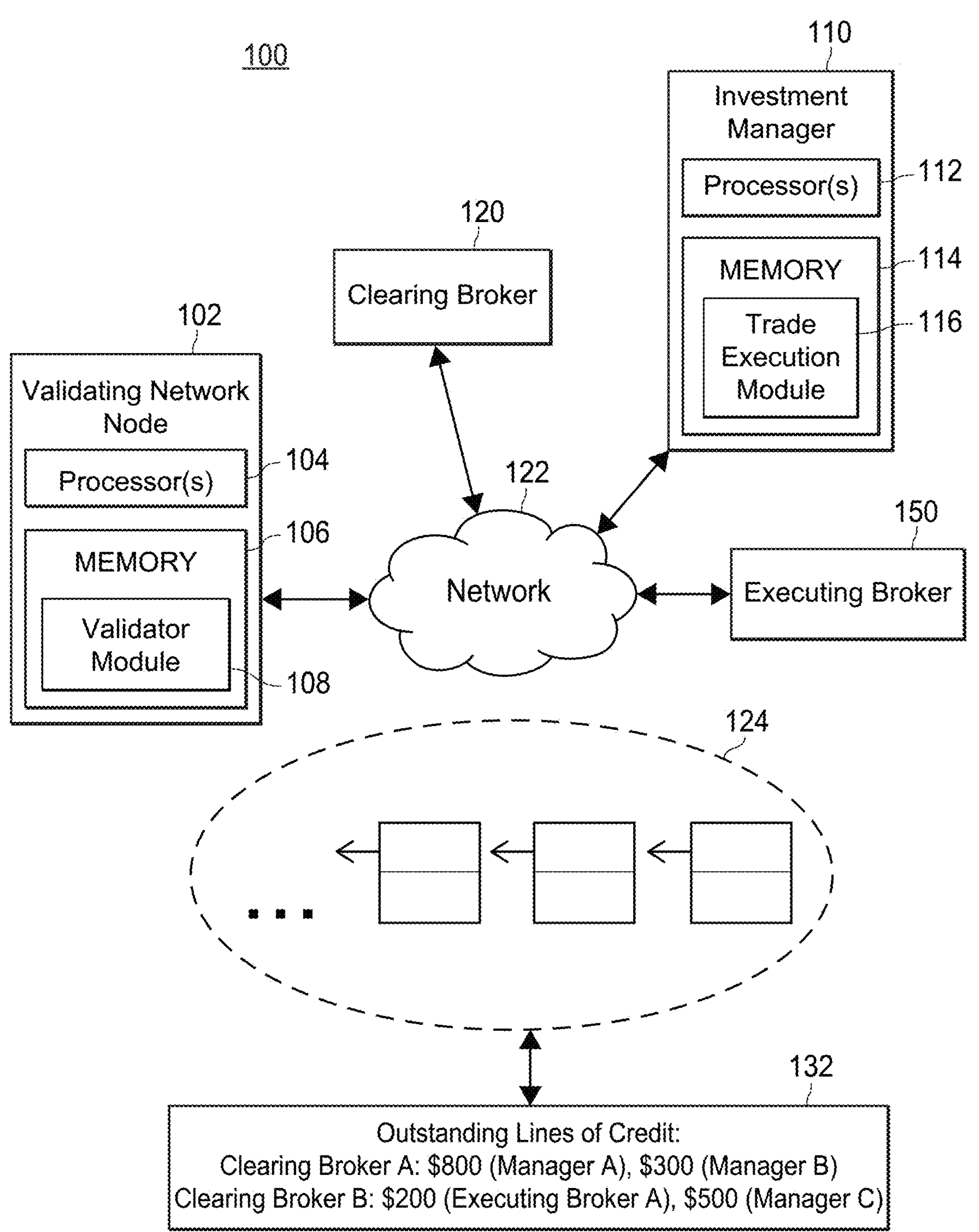
FIG. 1 illustrates a block diagram of a computer network and system on which a tokenized credit risk system may operate in accordance with an example aspect of the present disclosure.

A distributed ledger is a storage mechanism for data, events, transactions, etc. that is maintained by several participants. More specifically, a distributed ledger is a way of achieving a distributed consensus on the validity or invalidity of information recorded in the distributed ledger. In other words, the distributed ledger provides a decentralized trust to participants and observers. As opposed to relying on a central authority, a distributed ledger is a decentralized database in which a transactional record of changes to the ledger is maintained and validated by each node of a peer-to-peer network. One type of distributed ledger, a blockchain, is comprised of groupings of transactions organized together into a "block," and ordered sequentially (thus the term "blockchain"). While the distributed ledgers discussed herein are referred to in the context of a blockchain, this is merely one example of a distributed ledger. Distributed ledgers may also include a tangle, a block lattice, or directed acyclic graph (DAG), for example. For example, in a block lattice every address maintains its own chain of transactions and nodes store copies of each of the individual chains which make up the block lattice. In a tangle, each transaction validates two previous transactions. The transaction is then linked to the two previous transactions in a DAG. Thus, the tangle does not include blocks of transactions as in a blockchain but instead a transaction is added to the tangle once it approves the two previous transactions. While the disclosure refers to distributed ledgers in the context of a blockchain, any reference to a blockchain described herein may also apply to any other form of distributed ledger, such as a block lattice, tangle, DAG, etc.

In any event, nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes known to the validating node. If all of the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one implementation, the blockchain may be viewed as a shared spreadsheet that tracks data such as the ownership of assets. In another implementation, the validating nodes execute code contained in "smart contracts" and distributed consensus is expressed as the network nodes agreeing on the output of the executed code.

A smart contract is a computer protocol that enables the automatic execution and/or enforcement of an agreement between different parties. In particular, the smart contract may be computer code that is located at a particular address on the blockchain. In some cases the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, the action(s) performed may be determined based upon one or more decision conditions. In some instances, data streams may be routed to the smart contract so that the smart contract may detect that a trigger condition has occurred and/or analyze a decision condition.

Blockchains may be deployed in a public, decentralized, and permissionless manner, meaning that any party may view the distributed ledger, submit new information to be added to the ledger, or join the network as a validating node. Other blockchains are private (e.g., permissioned ledgers) that keep chain data private among a group of entities authorized to participate in the blockchain network. Other blockchain implementations may be both permissioned and permissionless whereby participants may need to be validated, but only the information that participants in the network wish to be public is made public.

In some implementations, a distributed ledger includes multiple blockchains such as a main blockchain and several side chains operating independently of the main blockchain. The side chains then interact with the main blockchain to provide some of the transaction data from the side chains to the main blockchain. In this manner, the side chains can be permissioned or private while the main blockchain is public or available to a larger number of entities than the side chains. Non-sensitive information from the side chains may be shared on the main blockchain. Also in some implementations, a distributed ledger includes multiple layers or separate blockchains executing in parallel that are maintained by the same validating nodes. Some of the transaction data from the blockchain for the first layer may be provided to the blockchain for the second layer or vice versa.

In one example, a distributed ledger in a tokenized credit risk system may be maintained by validating nodes which transmit data to remote systems using one or more public and/or private networks, such as a private enterprise network, the Internet, a satellite, a cellular router, a backhaul Internet or other type backhaul connection. The validating nodes receive transactions broadcasted to the distributed ledger network by, for example, user devices. The nodes then validate the broadcasted transactions.

The validating nodes may also execute code contained in "smart contracts" and other devices act as "evidence oracles" which provide evidence to the blockchain. Oracles may be systems, devices, or entities that connect a deterministic system with a non-deterministic system or data source.

In the following description, for the purposes of explanation, specific details are set forth in order to provide a thorough understanding of various implementations and examples. Various implementations may be practiced without these specific details. The figures and description are not intended to be restrictive.

FIG. 1 illustrates various aspects of an example tokenized credit risk system 100. The tokenized credit risk system 100 may include validating network nodes 102, an investment manager computing device 110, a clearing broker computing device 120, and an executing broker computing device 150 which may be communicatively connected through a network 122 as described below. According to embodiments, the validating network nodes 102 may be a combination of hardware and software components, also as described in more detail below with reference to FIG. 4. Each validating network node 102 may include a memory 106, one or more processors 104 such as a microcontroller or a microprocessor, and other components not shown in FIG. 1 (e.g., a random-access memory (RAM), and/or an input/output (I/O) circuit), all of which may be interconnected via an address/data bus.

The memory 106 and/or RAM may store various applications for execution by the one or more processors 104. For example, a user interface application may provide a user interface to the validating network node 102, which user interface may, for example, allow the system administrator to configure, troubleshoot, and/or test various aspects of the node's operation.

The memory 106 may be tangible, non-transitory memory and may include any types of suitable memory modules, including RAM, read-only memory (ROM), flash memory, other types of persistent memory, etc. The memory 106 may store, for example, instructions executable on the processors 104 for a validator module 108.

The validator module 108 may validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. Another consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

The validator module 108 may append distributed ledger data to the distributed ledger if the distributed ledger data satisfies the consensus rules by generating a new block of validated transactions to include in the distributed ledger 124 and/or by broadcasting a block of transactions to other network nodes. Otherwise, the validator module 108 disregards any distributed ledger data that does not satisfy the consensus rules, and the distributed ledger data is not propagated to other network nodes. For example, as shown in FIG. 1, the distributed ledger 124 indicates the outstanding lines of credit 132 provided by clearing brokers to investment managers/executing brokers. More specifically, the distributed ledger 124 may indicate that Clearing Broker A has provided $800 of credit to Investment Manager A and $300 of credit to Investment Manager B. The distributed ledger 124 may also indicate that Clearing Broker B has provided $200 of credit to Executing Broker A and $500 of credit to Investment Manager C. The validating network nodes 102 are discussed in more detail below.

The investment manager 110, clearing broker 120, and executing broker 150 computing devices may each include, by way of example, a tablet computer, a cell phone, a personal digital assistant (PDA), a mobile device smartphone also referred to herein as a "mobile device," a laptop computer, a desktop computer, a portable media player, a wearable computing device, smart glasses, smart watches, phablets, other smart devices, devices configured for wired or wireless RF (Radio Frequency) or optical communication, etc. Of course, any network-enabled device appropriately configured may interact with the tokenized credit risk system 100. The computing devices 110, 120, 150 need not necessarily communicate with the network 122 via a wired connection. In some instances, the computing devices 110, 120, 150 may communicate with the network 122 via wireless signals and, in some instances, may communicate with the network 122 via an intervening wireless or wired device, which may be a wireless router, a wireless repeater, a base transceiver station of a mobile telephony provider, an optical communications device, etc.

Each computing device 110, 120, 150 may include a memory 114, one or more processors 112 such as a microcontroller or a microprocessor, and other components not shown in FIG. 1 (e.g., a display, a communication unit, a user-input device, a RAM, and/or an I/O circuit), all of which may be interconnected via an address/data bus. The memory 114 may include an operating system, a data storage, a plurality of software applications, and/or a plurality of software routines. The operating system, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage may include data such as user profiles, application data for the plurality of applications, routine data for the plurality of routines, and/or other data necessary to interact with the validating network nodes 102 through the digital network 122. In some embodiments, the one or more processors 112 may also include, or otherwise be communicatively connected to, other data storage mechanisms (e.g., one or more hard disk drives, optical storage drives, solid state storage devices, etc.) that reside within the computing device 110, 120, 150.

The communication unit may communicate with the validating network nodes 102 via any suitable wireless communication protocol network, such as a wireless telephony network (e.g., GSM, CDMA, LTE, etc.), a Wi-Fi network (802.11 standards), a WiMAX network, a Bluetooth network, etc.

The user-input device may include a "soft" keyboard that is displayed on the display of the computing device 110, 120, 150, an external hardware keyboard communicating via a wired or a wireless connection (e.g., a Bluetooth keyboard), an external mouse, or any other suitable user-input device.

The one or more processors 112 may be adapted and configured to execute any one or more of the plurality of software applications and/or any one or more of the plurality of software routines residing in the memory, in addition to other software applications. One of the plurality of applications may be a client application that may be implemented as a series of machine-readable instructions for performing the various tasks associated with receiving information at, displaying information on, and/or transmitting information from the computing device 110, 120, 150.

One of the plurality of applications may be a native application and/or web browser, such as Apple's Safari®, Google Chrome™, Microsoft Internet Explorer®, and Mozilla Firefox® that may be implemented as a series of machine-readable instructions for receiving, interpreting, and/or displaying web page information while also receiving inputs from the user. Another application of the plurality of applications may include an embedded web browser that may be implemented as a series of machine-readable instructions for receiving, interpreting, and/or displaying web page information. One of the plurality of routines performed by the clearing broker 120 computing device may be a credit line minting routine which mints a digital token that represents a line of credit provided by the clearing broker 120, for example by interacting with a smart contract at a smart contract address on the distributed ledger 124. Another of the plurality of routines performed by the clearing broker 120 computing device may be a token transfer routine which sends the minted token to a distributed ledger address for an investment manager 110 receiving the line of credit. The token transfer routine generates a transaction including a reference to the minted token and the distributed ledger address for the investment manager 110, and broadcasts the transaction to, e.g., nodes 102 of the distributed ledger network.

More specifically, the clearing broker 120 computing device may mint a token, via a distributed ledger, by broadcasting a transaction to validating nodes 102 in the distributed ledger network requesting to mint the token and including information describing the line of credit such as the name of the party providing the line of credit (e.g., Clearing Broker A), the amount of credit being provided, the duration of the line of credit before it expires, and/or other terms and conditions of the line of credit.

The token may be an NFT. To mint the NFT, the clearing broker 120 computing device may broadcast a transaction to a smart contract which calls a function of the smart contract for minting the NFT, and passes in information describing the line of credit to the function. The smart contract then generates a unique token identifier for the NFT and includes the information describing the line of credit as properties of the NFT.

In other implementations, instead of the clearing brokers minting NFTs representing lines of credit where the NFTs have properties describing information regarding the line of credit (e.g., the issuer of the line of credit, the amount of credit, the duration of the line of credit, etc.), each clearing broker may mint its own set of fungible tokens. For example, Clearing Broker A may mint a first set of CBA tokens by deploying a smart contract to the distributed ledger (e.g., using the ERC-20 standard). Clearing Broker B may mint a second set of CBB tokens, etc. Each token may correspond to a particular amount of credit (e.g., 1 token may represent $1 of credit) and have a unique token name.

In some implementations, the memory 114 of the investment manager computing device 110 may store instructions for executing a trade execution module 116. The trade execution module 116 may receive a request, for example from the investment manager 110 to enter into a trade of an asset. For example, the trade may be for purchasing equities such as stock in a company or for purchasing futures contracts. The trade execution module 116 may then transmit the request to the executing broker 150 computing device. In some implementations, the trade execution module 116 transfers a token to a distributed ledger address for the executing broker 150 representing a line of credit provided by the clearing broker 120, where the line of credit is sufficient to cover the cost of the trade.

The executing broker 150 computing device monitors the distributed ledger 124 to determine whether the investment manager 110 has a token representing a sufficient line of credit provided by the clearing broker 120 and/or has transferred the token to the executing broker 150. In response to identifying the token, the executing broker 150 computing device may place a fulfillment order for the trade by the investment manager 110. In some implementations, the executing broker 150 then transfers the token to a distributed ledger address for the clearing broker 120. In other implementations, the executing broker 150 may burn the token by transferring the token to a burn address which is not accessible by any participants in the distributed ledger network so that the line of credit cannot be used twice.

The clearing broker 120 computing device may then monitor the distributed ledger 124 to determine whether the investment manager has a token representing a sufficient line of credit provided by the clearing broker 120, and/or to determine whether the token has been transferred back to the clearing broker 120 or has been burned. In response to determining that the investment manager 110 has a token representing a sufficient line of credit provided by the clearing broker 120, and/or that the token has been transferred back to the clearing broker 120 or has been burned, the clearing broker 120 computing device settles the trade of the asset into an account for the investment manager 110.

It will be appreciated that although only three computing devices 110, 120, 150 and one validating network node 102 is depicted in FIG. 1, any suitable number of computing devices 110, 120, 150 and any suitable number of validating network nodes 102 may be included in the tokenized credit risk system. In some instances, the computing devices 110, 120, 150 may also operate as validating network nodes 102 and/or validating network nodes 102 may also operate as the computing devices 110, 120, 150.

The computing devices 110, 120, 150 and validating network nodes 102, 150 may communicate with each other via the network 122. The digital network 122 may be a proprietary network, a secure public Internet, a virtual private network and/or some other type of network, such as dedicated access lines, plain ordinary telephone lines, satellite links, a wireless telephony network, combinations of these, etc. Where the digital network 122 comprises the Internet, data communication may take place over the digital network 122 via an Internet communication protocol.

Figure 2:
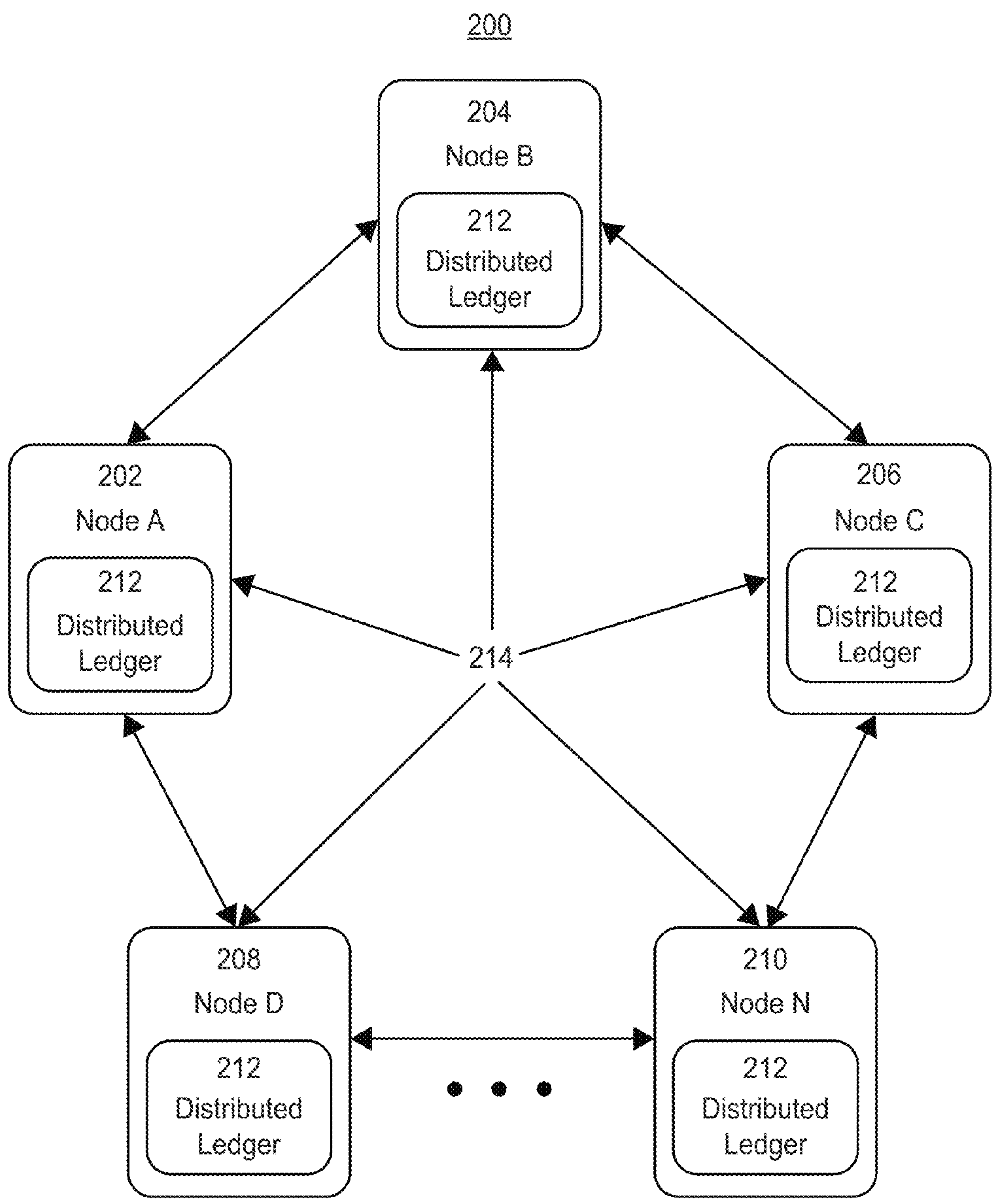
FIG. 2 is an exemplary distributed ledger system for recording transactions and executing smart contracts in a tokenized credit risk system.

As mentioned above, digital token transfers are recorded in a distributed ledger. FIG. 2 depicts an exemplary distributed ledger system 200 for recording transactions and executing smart contracts in a tokenized credit risk system 100. The system 200 includes a distributed ledger 212 (e.g., having one or more distributed ledger layers) and a plurality of nodes 202, 204, 206, 208, and 210 (e.g., each similar to node 102 of FIG. 1). Each node maintains a copy of the distributed ledger 212. As changes are made to the distributed ledger 212, each node receives the change via the network 214 and updates its respective copy of the distributed ledger 212. A consensus mechanism may be used by the nodes 202-210 in the distributed ledger system 200 to decide whether it is appropriate to make received changes to the distributed ledger 212 or to a particular layer of the distributed ledger 212.

Each node in the system therefore has its own copy of the distributed ledger 212, which is identical to every other copy of the distributed ledger 212 stored by the other nodes. The distributed ledger system 200 may be more robust than a central authority database system because of the distributed ledger's decentralized nature. As such, there is no single point of failure on the distributed ledger system 200 as there would be in a centralized system.

Figure 3:
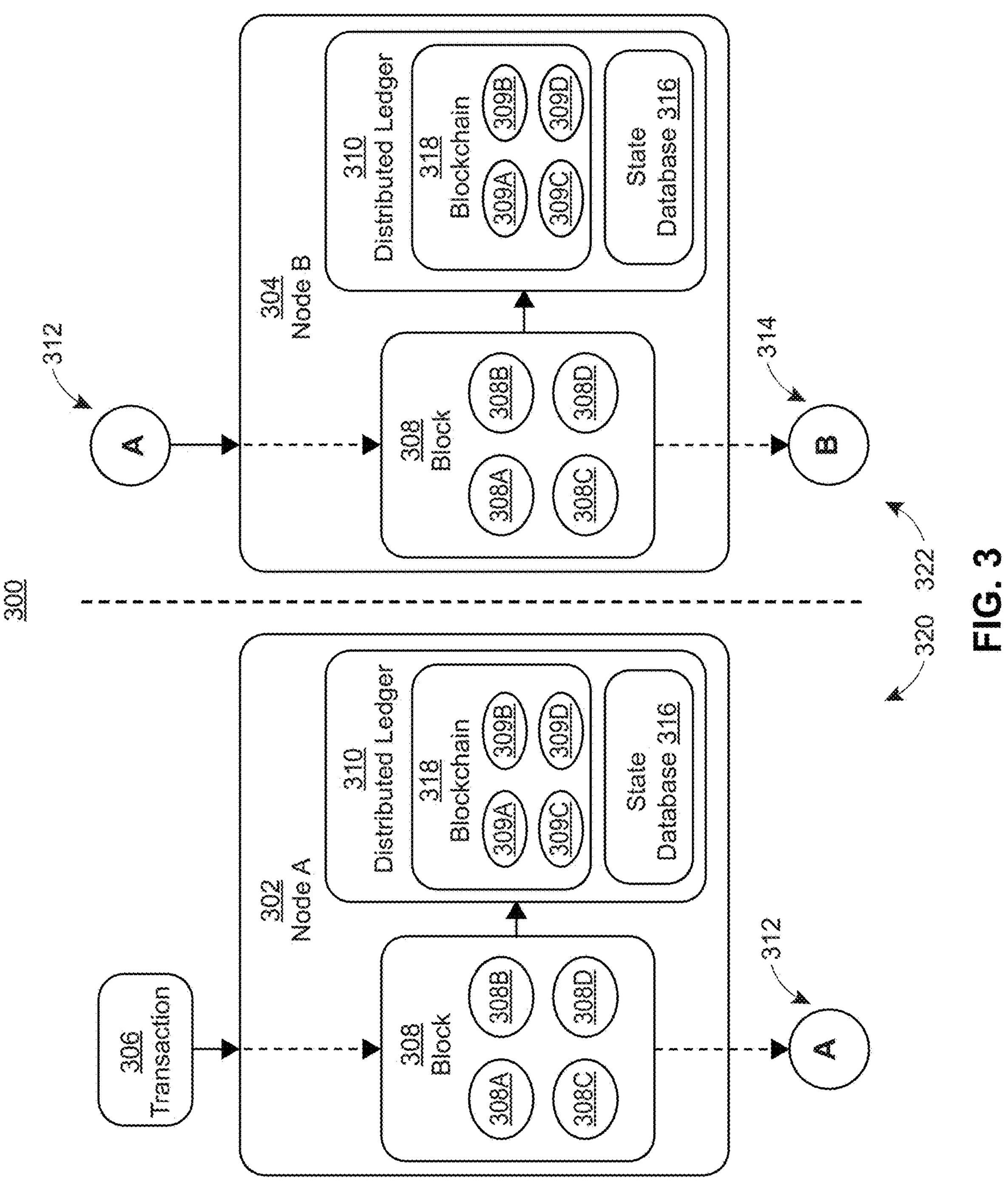
FIG. 3 illustrates exemplary validating network nodes and an exemplary transaction flow on a distributed ledger network in a tokenized credit risk system.

FIG. 3 depicts exemplary validating network nodes and an exemplary transaction flow 300 on a distributed ledger network for resolving transactions. FIG. 3 includes two time frames 320 and 322 represented by the left and right sides of the dotted line, respectively, Node A 302 and Node B 304, a set of transactions 3308A-308D, a set of blocks of transactions 309A-309D, a distributed ledger 310, and a blockchain 318.

The block propagation flow 300 may begin with Node A 302 receiving transaction 306 at time 320. When Node A 302 confirms that transaction 306 is valid, Node A 302 may add the transaction to a newly generated block 308. As part of adding the transaction 306 to block 308, Node A 302 may solve a cryptographic puzzle and include the solution in the newly generated block 308 as proof of the work done to generate the block 308. Alternatively, a proof of stake algorithm may be used to generate the block 308, whereby Node A 302 "stakes" an amount of a digital token used on the network, however, the network itself determines the node that will mint the new block. In another implementation, a proof of authority (PoA) algorithm may be used to generate the block 308, where transactions and blocks are validated by approved accounts, known as validators which run software allowing them to record transactions in the distributed ledger.

In other embodiments, the transaction 306 may be added to a pool of transactions until a sufficient number of transactions in the pool exist to form a block or distributed ledger entry. Node A 302 may transmit the newly created distributed ledger entry 308 to the network at time 312. Before or after propagating the distributed ledger entry 308, Node A 302 may add the distributed ledger entry 308 to its copy of the distributed ledger 310.

While proof of work, proof of stake, and proof of authority are described herein as consensus algorithms for selecting a node to mint a new block, these are merely a few example consensus algorithms and are not intended to be limiting. Additional consensus algorithms may be utilized, such as delegated proof of stake where nodes elect a subset of nodes referred to as delegates to perform validation, and the delegates take turns minting new blocks. Consensus algorithms may also include proof of weight, Byzantine fault tolerance, tangle consensus algorithms, block lattice consensus algorithms, etc. Additionally, quorum slices may be selected where a quorum is a set of nodes that participate in the consensus protocol and a quorum slice is its subset that helps a node in its agreement process. Individual trust decisions may be made by participants in the distributed ledger network to construct a quorum slice. Still further, security circles may be identified which are closed groups of network participants who together can form a quorum to reach a consensus on a transaction and to make further trust decisions.

In any event, the transactions 309A-309D may include updates to a state database 316. The state database 316 may contain current values of variables created by smart contracts deployed on the distributed ledger 310. Validated distributed ledger entries, such as distributed ledger entry 308, may include transactions effecting state variables in state database 316. At time 322, Node B 304 may receive the newly created distributed ledger entry 308 via the network. Node B 304 may verify that the distributed ledger entry 308 is valid by checking the solution to the cryptographic puzzle provided in the distributed ledger entry 308. If the solution is accurate, then Node B 304 may add the distributed ledger entry 308 to its distributed ledger 310 and make any updates to the state database 316 as rejected by the transactions in distributed ledger entry 308. Node B 304 may then transmit the distributed ledger entry 308 to the rest of the network at time 314.

Figure 4:
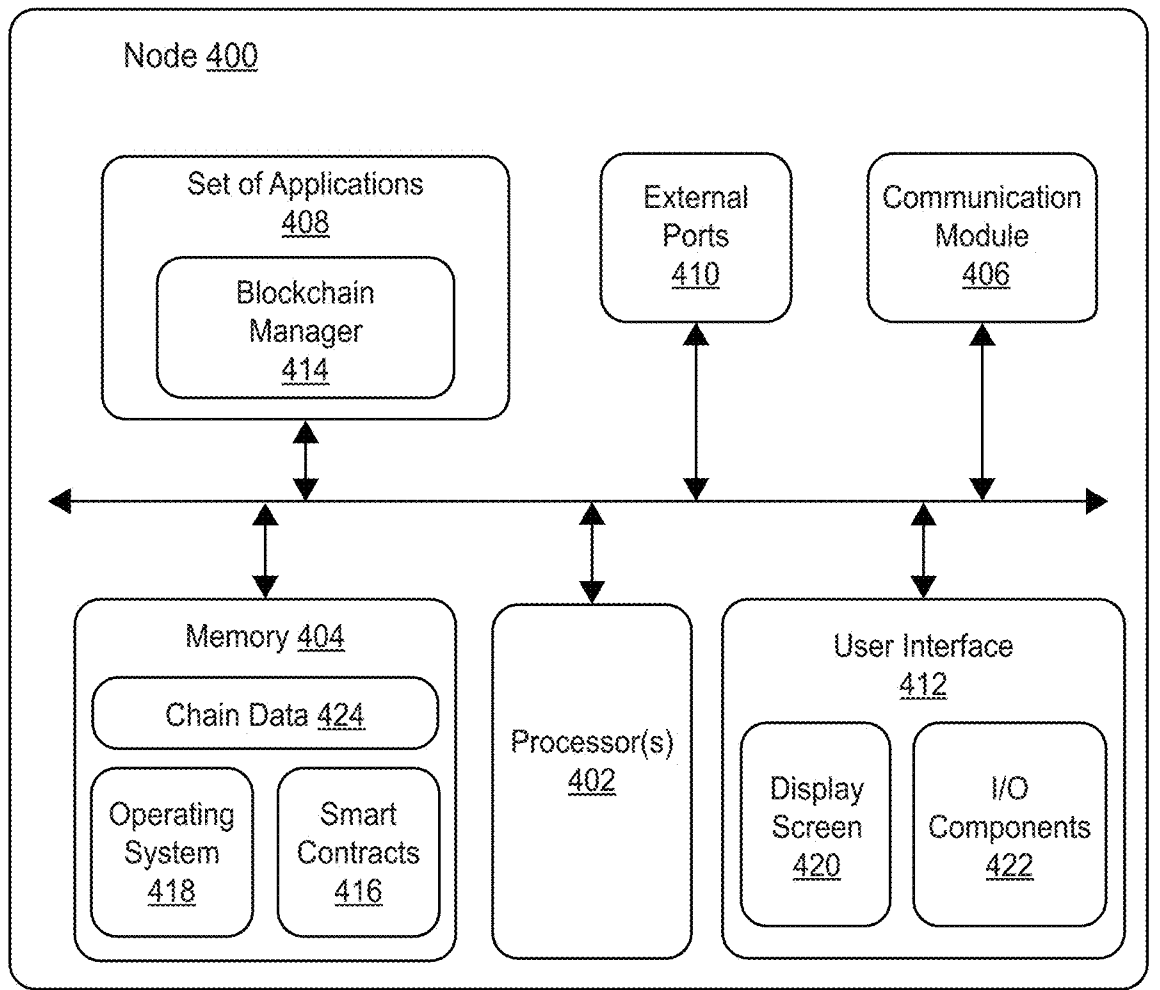
FIG. 4 illustrates exemplary components of a network node on a distributed ledger network in a tokenized credit risk system.

FIG. 4 depicts exemplary components of a validating network node 400 on a distributed ledger network for recording transactions and executing smart contracts in a tokenized credit risk system. The validating network node 400 may be similar to the validating network node 102 described above with reference to FIG. 1. Node 400 may include at least one processor 402, memory 404, a communication module 406 such as a transceiver, a set of applications 408, external ports 410, a blockchain manager 414, smart contracts 416, and an operating system 418. In some embodiments, the node 400 may generate a new block of transactions, or may broadcast transactions to other network nodes via the transceiver 406 by using the blockchain manager 414. Similarly, the node 400 may use the blockchain manager 414 in conjunction with the smart contracts 416 stored in the memory 404 to execute the functionality disclosed herein. The memory 404 may further include state data/chain data 424 including, for example, a state database of the blockchain for storing states of smart contracts deployed thereon.

In other embodiments, the smart contracts 416 operate independent of the blockchain manager 414 or other applications. In some embodiments, the node 400 does not have a blockchain manager 414, or smart contracts 416 stored at the node. In some embodiments, the node 400 may have additional or fewer components than described.

Figure 5:
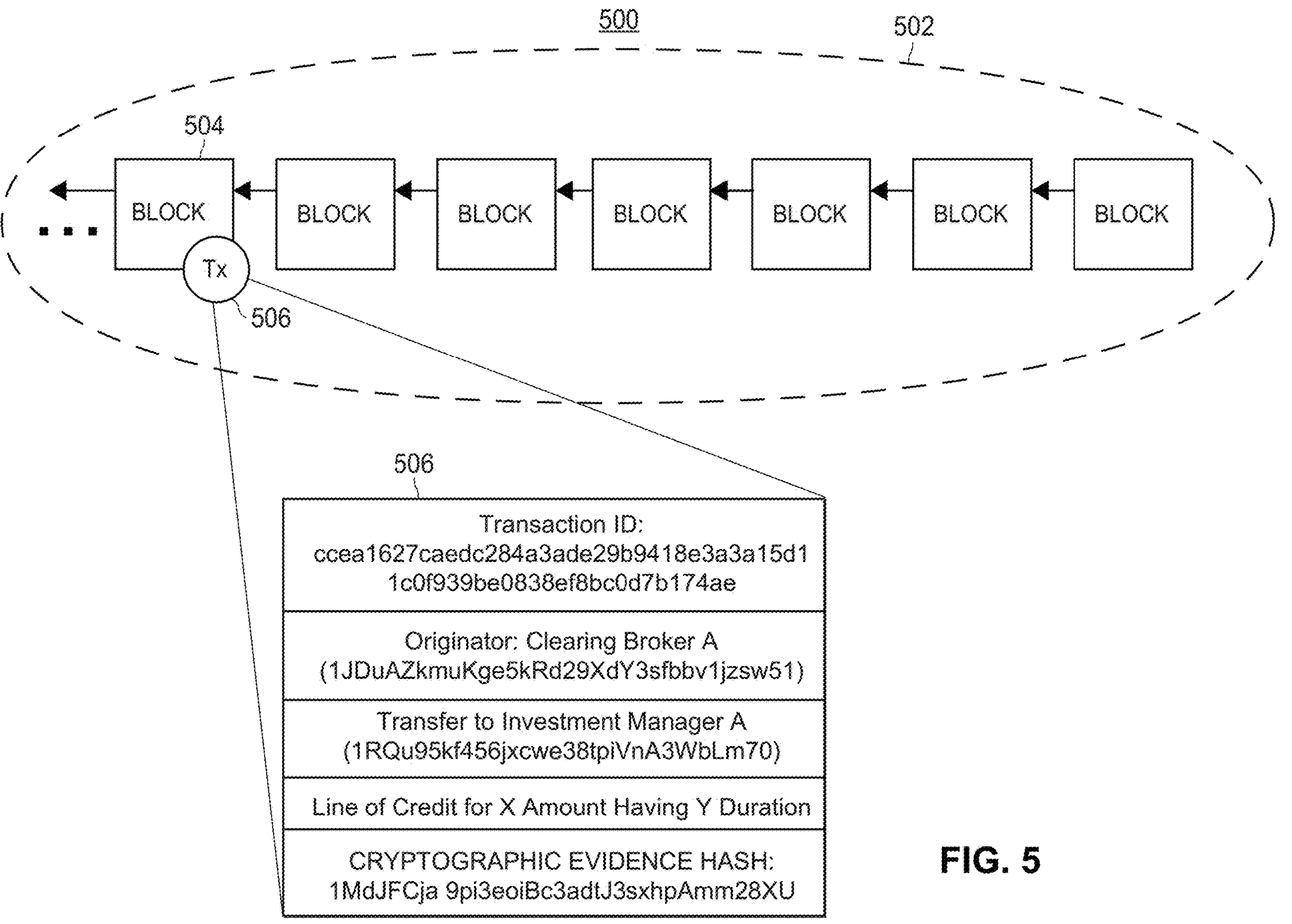
FIG. 5 illustrates an example transaction recording a transfer of a token representing a line of credit from a clearing broker to an investment manager.

An example distributed ledger may include a blockchain 502 as shown in FIG. 5 having blocks 504 of transactions. In some embodiments, the blockchain 502 includes several blocks 504 connected together to form a chain of blocks 504 of transactions. To cryptographically link blocks and transactions together, each block in the blockchain 502 organizes its transactions into a Merkle Tree. In a Merkle Tree each transaction is hashed according to a cryptographic hashing algorithm (e.g., SHA-256) and the resulting output hash is then combined with the hash of another transaction. Then the combined result is also hashed according to the cryptographic hashing algorithm. This output is then combined with the hash of two other transactions and this process is repeated until all of the transactions in the block are combined and hashed to generate a Merkle root that is used in the header for a block 504. If any single transaction in the block is tampered with, a different Merkle root would be generated since the Merkle root is a combination of the hashes of all of the transactions in the block.

In other words, the transactions may be hashed using a cryptographic hash algorithm, such as the algorithms discussed above, and the hash of each transaction may be stored in the tree. As the tree is constructed the hash of each adjacent node at the same level may be hashed together to create a new node that exists at a higher level in the tree. Therefore, the node at the top of the tree or Merkle root, is dependent upon the hash of each transaction stored below in the tree. Each transaction may include a set of data. The set of data may include identifying data for the transaction, and transaction data identifying the nature of the transaction and what the transaction entails (e.g., input and output addresses, a transaction value, a document hash value, a timestamp, a transaction fee value, etc.).

To verify that a block is valid, a node may compare the Merkle root of the block to the Merkle root for the same block included in other nodes' copies of the blockchain. Thus, the Merkle root can be used as proof of the transactions included in the block and as proof that the contents of the block have not been tampered with if the Merkle root is the same in each node's copy of the block. A node may also perform a similar process with a block lattice.

In one implementation, documents stored "on" a blockchain are documents that have been hashed according to a cryptographic hashing algorithm (e.g., SHA-256) and the resulting output hash has been included in a transaction in a block that has been accepted by the network nodes as satisfying the consensus rules of the blockchain. As such, the documents may be later verified or validated by comparing the hash of the documents to the hash stored on the blockchain. For example, if a set of documents results in a SHA-256 hash that was recorded on a blockchain on a certain date, then the blockchain provides cryptographic proof that the documents existed as of that date.

One way of storing a document on a blockchain is to broadcast a transaction including a hash of the document to the network, which will be included in a block if the transaction satisfies all of the consensus rules of the network. In some implementations, the blockchain is a permissioned ledger, meaning only authorized network participants may broadcast transactions. In other implementations, only some authorized network participants may make certain transactions. Only a cryptographic hash of the data may be included in the blockchain 502, such that the data may be verified using the blockchain even if it is obtained by a party off-chain.

Validating network nodes may verify that the signed transaction or signed message was signed by the private cryptographic key corresponding to the published public cryptographic key owned by the user generating the transaction. In at least one implementation, a valid proof-of-identity may be applied as a consensus rule by the blockchain network. As such, any transaction attempting to exchange a digital token or interact with a smart contract without a cryptographic proof-of-identity matching an identity authorized to exchange a digital token or interact with a smart contract is rejected by the network as non-compliant with the consensus rule. Each owner may be assigned a public key/private key pair which is identified in the blockchain network as corresponding to the owner. If the validating network nodes receive a transaction that is not from an authorized owner, the validating network nodes reject the transaction.

For example, if the owner of a particular address corresponding to a public cryptographic key submits a transaction to transfer a digital token representing a line of credit from Clearing Broker A to another owner of another address, the transaction must include a cryptographic proof-of-identity indicating that the owner is in possession of the private cryptographic key corresponding to the public cryptographic key for the particular address. This proves that the owner is in possession of the digital token at the particular address and is able to transfer the digital token from the particular address.

In some implementations, the blockchain 502 is a public blockchain meaning that any party may view the distributed ledger, submit new information to be added to the ledger, or join the network as a validating node. The distributed ledger may also include side chains which are private or permissioned blockchains that keep chain data private among a group of entities authorized to participate in the side blockchain network. In other embodiments, the main blockchain 502 is also a permissioned blockchain but the main blockchain 502 has a larger number of entities authorized to participate in the blockchain network than the side chains.

In addition to protecting privacy via side chains, in some embodiments, privacy may be preserved on the main blockchain 502. For example, the transactions in the blockchain 502 may obfuscate the identities of the parties to the transaction and the transaction amounts through various encryption techniques.

FIG. 5 illustrates an exemplary transaction 506 representing the transfer of a digital token representing a line of credit from a first user (Clearing Broker A) who minted the token to a second user (Investment Manager A). The first user may broadcast the transaction 506, via the clearing broker 120 computing device, to blockchain 502 to be included in a block, such as block 504.

The transaction 506 may include a transaction ID and an originator such as Clearing Broker A (identified by a cryptographic proof-of-identity and a blockchain address for Clearing Broker A). The transaction 506 may also include an indication that the transaction 506 is a transfer of a particular digital token (e.g., a digital token representing a line of credit for X amount having Y duration), and a blockchain address at which to transfer the digital token (Investment Manager A's blockchain address).

Furthermore, the transaction 506 may include a cryptographic hash of the transaction information including the to and from addresses and the token being transferred. In another implementation, the information regarding the to and from address and the token being transferred is not stored as a cryptographic hash, but is directly accessible in block 504 by an observer or other network participant.

In some implementations, the digital token is a non-fungible token (NFT). For example, each NFT may have a unique token identifier and information describing the line of credit such as the name of the party providing the line of credit (e.g., Clearing Broker A), the amount of credit being provided (e.g., $1,000), the duration of the line of credit before it expires (e.g., two weeks), other terms and conditions of the line of credit (e.g., the line of credit is for Investment Manager A only and is nontransferable, the line of credit is transferrable, a list of parties the line of credit can be transferred to, etc.).

A computing device (e.g., the clearing broker 120 computing device) may generate a smart contract for minting and transferring credit risk NFTs, and deploy the smart contract to the distributed ledger. Then when a clearing broker, such as Clearing Broker A wants to mint a new NFT representing a new line of credit provided by Clearing Broker A, Clearing Broker A's computing device broadcasts a transaction to the smart contract which calls a function of the smart contract for minting the NFT, and passes in information describing the line of credit to the function. The smart contract then generates a unique token identifier for the NFT and includes the information describing the line of credit as properties of the NFT.

In this manner, each new line of credit issued by a clearing broker 120 in the distributed ledger network is represented by a unique NFT. Then when the investment manager 110 requests to trade an asset, the investment manager 110 may use the NFT as proof of the line of credit issued by the clearing broker 120. The investment manager 110 can then trade the asset as long as the line of credit has not expired, the amount of credit exceeds the cost of the trade, and/or other terms and conditions of the line of credit are satisfied.

In some scenarios, the cost of the trade may be significantly less than the amount of credit indicated by the NFT. Accordingly, the investment manager 110 may not want to transfer or burn the entire NFT if the investment manager 110 will have credit remaining after the trade. The clearing broker 120, the investment manager 110, and/or another participant in the distributed ledger network may fractionalize the NFT into fungible tokens each representing a fractional portion of the NFT. To fractionalize the NFT, the owner of the NFT may transfer the NFT to a smart contract address for a smart contract configured to lock the NFT and generate a number of fungible tokens each representing a fractional portion of the NFT. The owner may determine the number of fractional shares or fungible tokens to be issued.

For example, if the NFT is for $300 of credit, the owner may request the smart contract to generate 300 fungible tokens and transfer them to the owner, so that each fungible token represents 1/300 of the value of the NFT or $1 of credit. Then the smart contract may transfer the fungible tokens to the owner. When the owner is the investment manager 110 and the investment manager 110 requests to trade an asset where the cost of the trade is a fraction of the amount of credit represented by the NFT, the investment manager 110*c* may transfer or burn a number of fungible tokens corresponding to the cost of the trade. Then the investment manager may retain fungible tokens for subsequent trades, and may continue to transfer or burn fungible tokens until each of the fungible tokens generated for the NFT have been transferred or burned or the line of credit has expired.

In this implementation, the tokenized credit risk system 100 may use an unspent transaction output (UTXO) model to aggregate the amount of unspent outputs at a user's address to determine the fungible token value remaining at the user's address. Then when the user transfers a particular amount of fungible tokens to another user (e.g., the executing broker 150, the clearing broker 120, or a burn address), the validating network nodes 102 determine whether the user's address has at least the particular amount of fungible tokens as unspent outputs. If the user's address has at least the particular amount of fungible tokens, the validating network nodes 102 determine that the transaction satisfies the consensus rules and the particular amount of fungible tokens are removed from the user's unspent outputs. The fungible token value at the user's address is then reduced to the difference between the user's previous unspent outputs and the transaction value.

In yet other implementations, instead of the clearing brokers minting NFTs representing lines of credit where the NFTs have properties describing information regarding the line of credit (e.g., the issuer of the line of credit, the amount of credit, the duration of the line of credit, etc.), each clearing broker may mint its own set of fungible tokens. For example, Clearing Broker A may mint a first set of CBA tokens. Clearing Broker B may mint a second set of CBB tokens, etc. Each token may correspond to a particular amount of credit (e.g., 1 token may represent $1 of credit) and have a unique token name. Then a particular clearing broker 120 may transfer its respective tokens to investment managers 110 or executing brokers 150 representing lines of credit issued to the investment managers 110 or executing brokers 150. When an investment manager 110 has a clearing agreement with a particular clearing broker 120 and requests to trade an asset, the particular clearing broker 120 determines whether the investment manager 110 has transferred or burned a sufficient number of the clearing broker's fungible tokens (e.g., CBA tokens) before settling the trade.

In any event, in response to receiving the token representing the line of credit from the clearing broker 120, the investment manager 110 may request to trade an asset, for example via user controls at the investment manager 110 computing device. In other implementations, the trade request may be triggered automatically based on a particular set of conditions. The investment manager 110 computing device provides the request to the executing broker 150 computing device. In some implementations, the investment manager 110 computing device also transfers the token representing a line of credit sufficient to cover the cost of the trade to the executing broker 150 to prove the investment manager 110 has enough credit for the trade.

Figure 6:
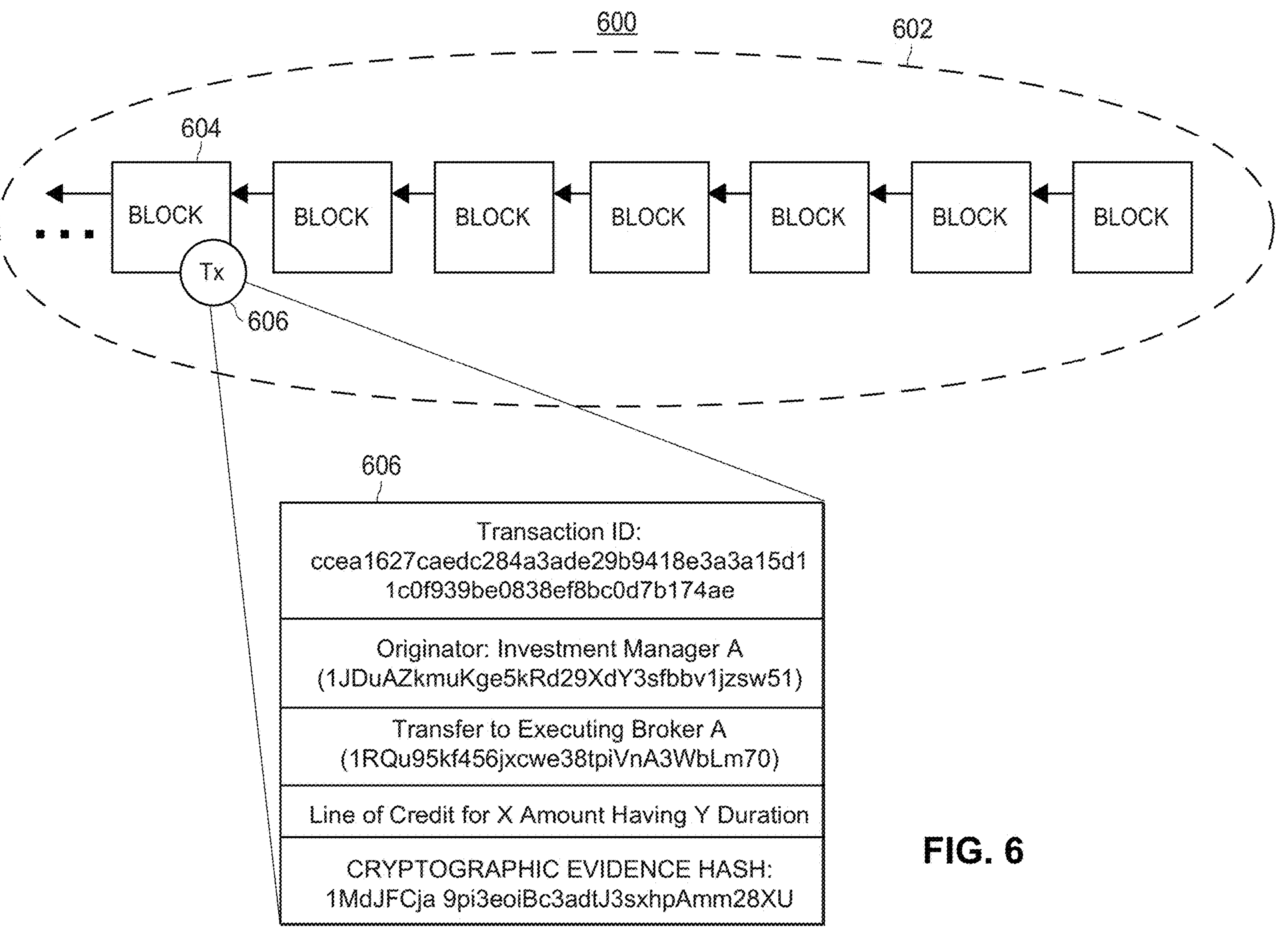
FIG. 6 illustrates another example transaction recording a transfer of a token representing a line of credit from an investment manager to an executing broker.

FIG. 6 illustrates an exemplary transaction 606 representing the transfer of the digital token representing the line of credit from a second user (Investment Manager A) to a third user (Executing Broker A). The second user may broadcast the transaction 606, via the investment manager 110 computing device, to blockchain 602 to be included in a block, such as block 604.

The transaction 606 may include a transaction ID and an originator such as Investment Manager A (identified by a cryptographic proof-of-identity and a blockchain address for Investment Manager A). The transaction 606 may also include an indication that the transaction 606 is a transfer of a particular digital token (e.g., a digital token representing a line of credit for X amount having Y duration), and a blockchain address at which to transfer the digital token (Executing Broker A's blockchain address).

Furthermore, the transaction 606 may include a cryptographic hash of the transaction information including the to and from addresses and the token being transferred. In another implementation, the information regarding the to and from address and the token being transferred is not stored as a cryptographic hash, but is directly accessible in block 604 by an observer or other network participant.

Then when the executing broker 150 receives the request from the investment manager 110 to trade the asset, the executing broker may monitor the distributed ledger 602 to determine that a token representing the line of credit has been transferred from the investment manager 110 to the executing broker 150. The executing broker 150 may also monitor the distributed ledger to determine the amount of credit represented by the token and the expiration date for the line of credit. Then the executing broker 150 may determine whether the amount of credit is sufficient to cover the cost of the trade requested by the investment manager 110 and whether the line of credit has expired. In response to determining that the amount of credit is sufficient to cover the cost of the trade and the line of credit has not expired, the executing broker 150 may place a fulfillment order for the trade with the clearing broker 120 that has a clearing agreement with the investment manager 110.

In other implementations, the investment manager 110 does not transfer the token to the executing broker 150. Instead, when the executing broker 150 receives the request from the investment manager 110 to trade the asset, the executing broker 150 may monitor the distributed ledger 602 to determine that the investment manager 110 has a token representing the line of credit which is sufficient to cover the cost of the trade and has not expired. Then in response to determining that the investment manager 110 has the token representing the line of credit which is sufficient to cover the cost of the trade and has not expired, the executing broker 150 places the fulfillment order.

In yet other implementations, the investment manager 110 transfers the token to a burn address to burn the token so that the same line of credit cannot be used for multiple trades. When the executing broker 150 receives the request from the investment manager 110 to trade the asset, the executing broker 150 may monitor the distributed ledger 602 to determine that the investment manager 110 has transferred the token to a burn address, and the line of credit represented by the token is sufficient to cover the cost of the trade and has not expired. Then in response to determining that the investment manager 110 has transferred the token to a burn address, the executing broker 150 places the fulfillment order.

In other implementations, the investment manager 110 transfers the token to a smart contract. The smart contract may then determine whether the line of credit represented by the token has expired. In response to determining that the line of credit has not expired, the smart contract may automatically transfer the token to the executing broker 150 or to a burn address. In some scenarios, the investment manager 110 may also provide an indication of the cost of the trade to the smart contract. The smart contract may then fractionalize the token by generating a number of fungible tokens each representing a fractional portion of the token. Then the smart contract may transfer an amount of the fungible tokens to the executing broker 150 or the burn address which corresponds to the cost of the trade. Then smart contract may also transfer the remaining amount of fungible tokens back to the investment manager 110 to use for subsequent trades. For example, if the line of credit is for $1,000 and the cost of the trade is $200, the smart contract may transfer 20% of the fungible tokens to the executing broker 150 or the burn address and may transfer the remaining 80% back to the investment manager 110.

The smart contract may also set a flag indicating that the line of credit represented by the token is sufficient to cover the cost of the trade and has not expired. The executing broker 150 may monitor the distributed ledger 602 to determine that the smart contract has set a flag indicating that the line of credit represented by the token is sufficient to cover the cost of the trade and has not expired. Then in response to identifying the flag set by the smart contract, the executing broker 150 places the fulfillment order.

In some implementations, the executing broker 150 transmits a transaction to the smart contract indicating that the executing broker 150 has placed the fulfillment order. In response to receiving an indication that the executing broker 150 has placed the fulfillment order, the smart contract transfers the token to the executing broker 150 or to a burn address. Otherwise, the smart contract may transfer the token back to the investment manager 110 if the line of credit was not used to fulfill the order.

If the executing broker 150 does not receive a proof of the line of credit sufficient to cover the cost of the trade from the investment manager 110, the executing broker 150 may not place the fulfillment order.

In some scenarios, the investment manager 110 may transfer the token to another investment manager or other party who can then use the token as proof of a line of credit with the clearing broker 120. In these scenarios, the token may indicate the conditions of the line of credit (e.g., the line of credit is for Investment Manager A only and is nontransferable, the line of credit is transferrable, a list of parties the line of credit can be transferred to, etc.).

The consensus rules for the distributed ledger may require that token transfers meet the terms of the line of credit. The validating nodes 102 in the distributed ledger network may then append the transaction to the distributed ledger in response to determining that the transfer does not violate any of the terms of the line of credit, such as that the line of credit is nontransferable or the party receiving the line of credit is not included in a list of parties that the line of credit can be transferred to.

In other implementations, the consensus rules for the distributed ledger do not require that token transfers meet the terms of the line of credit, but the investment manager 110 or any other owner of the token may have to transmit the transaction for transferring the token to another party to a smart contract. The smart contract may then determine whether the transfer satisfies the conditions of the line of credit indicated by the token, and the smart contract may only transfer the token to the other party in response to determining that the transfer satisfies the conditions of the line of credit indicated by the token (e.g., the token is transferrable, the line of credit has not expired, the party receiving the token is included in a list of parties the line of credit can be transferred to, etc.).

In any event, when the executing broker 150 receives the token from the investment manager 110 and places the fulfillment order with the clearing broker 120, the executing broker 150 computing device may transfer the token back to the clearing broker 120 to prove the investment manager 110/executing broker 150 has enough credit for the trade.

Figure 7:
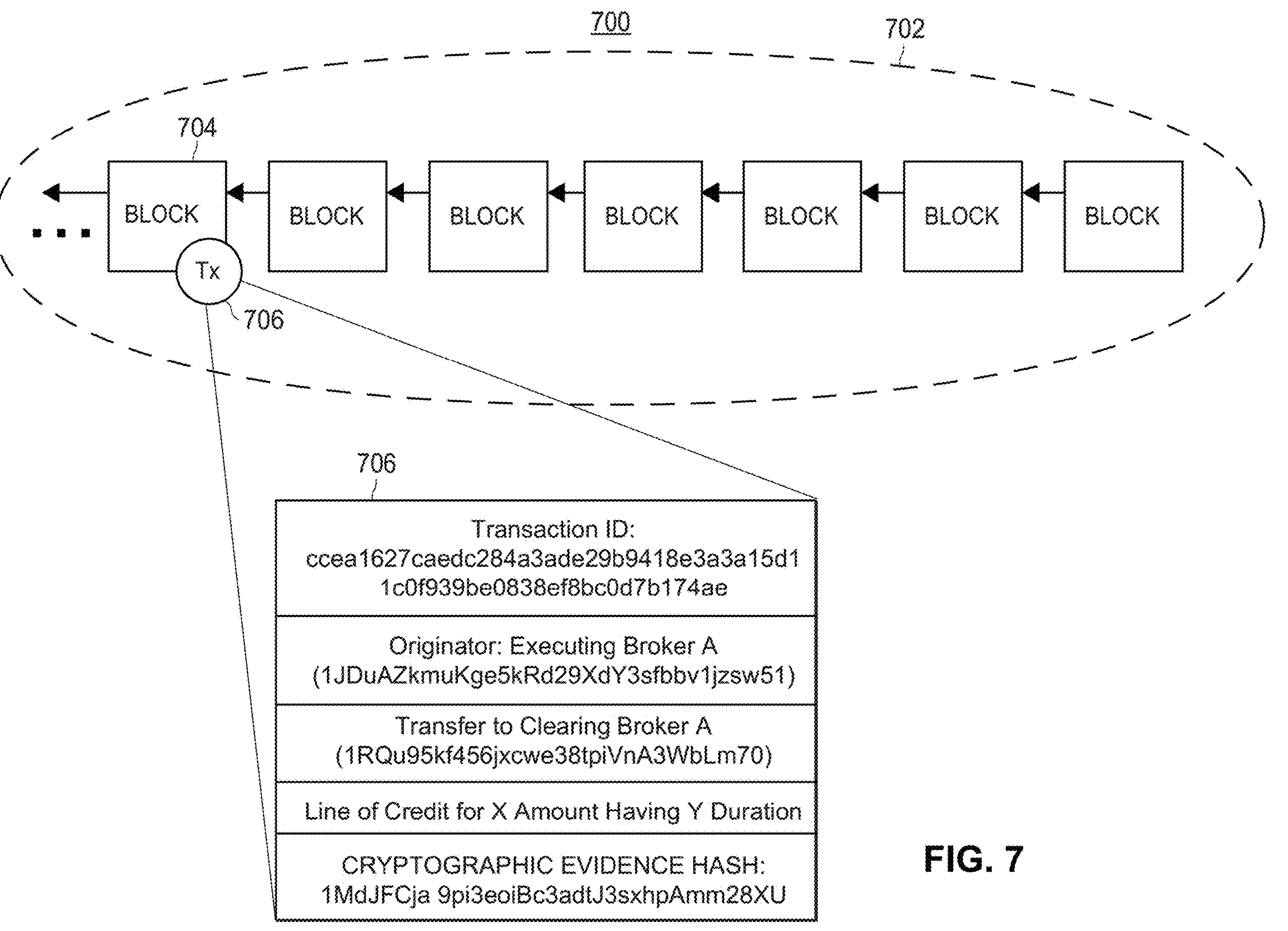
FIG. 7 illustrates an example transaction recording a transfer of a token representing a line of credit from the executing broker to the clearing broker.

FIG. 7 illustrates an exemplary transaction 706 representing the transfer of the digital token representing the line of credit from the third user (Executing Broker A) back to the first user (Clearing Broker A). The third user may broadcast the transaction 706, via the executing broker 150 computing device, to blockchain 702 to be included in a block, such as block 704.

The transaction 706 may include a transaction ID and an originator such as Executing Broker A (identified by a cryptographic proof-of-identity and a blockchain address for Executing Broker A). The transaction 706 may also include an indication that the transaction 706 is a transfer of a particular digital token (e.g., a digital token representing a line of credit for X amount having Y duration), and a blockchain address at which to transfer the digital token (Clearing Broker A's blockchain address).

Furthermore, the transaction 706 may include a cryptographic hash of the transaction information including the to and from addresses and the token being transferred. In another implementation, the information regarding the to and from address and the token being transferred is not stored as a cryptographic hash, but is directly accessible in block 704 by an observer or other network participant.

Then when the clearing broker 120 receives the fulfillment order on behalf of the investment manager 110 for trading the asset, the clearing broker 120 may monitor the distributed ledger 702 to determine that a token representing the line of credit has been transferred from the executing broker 150 to the clearing broker 120. The clearing broker 120 may also monitor the distributed ledger 702 to determine the amount of credit represented by the token and the expiration date for the line of credit. Additionally, the clearing broker 120 may monitor the distributed ledger 702 to determine that the line of credit was issued by Clearing Broker A. Then the clearing broker 120 may determine whether the amount of credit is sufficient to cover the cost of the trade requested by the investment manager 110, whether the line of credit has expired, and whether the party providing the line of credit is Clearing Broker A. In response to determining that the amount of credit is sufficient to cover the cost of the trade, the line of credit has not expired, and the party providing the line of credit is Clearing Broker A, the clearing broker 120 may settle the trade into an account for the investment manager 110.

In other implementations, the executing broker 150 does not transfer the token to the clearing broker 120. Instead, when the executing broker 150 places the fulfillment order with the clearing broker 120, the clearing broker 120 may monitor the distributed ledger 702 to determine that the investment manager 110 and/or executing broker 150 has a token representing the line of credit which is sufficient to cover the cost of the trade, has not expired, and the clearing broker 120 provided the line of credit. Then in response to determining that the investment manager 110 and/or executing broker 150 has a token representing the line of credit which is sufficient to cover the cost of the trade, has not expired, and the clearing broker 120 provided the line of credit, the clearing broker 120 settles the trade into an account for the investment manager 110.

In yet other implementations, the executing broker 150 transfers the token to a burn address to burn the token so that the same line of credit cannot be used for multiple trades. When the executing broker 150 places the fulfillment order with the clearing broker 120, the clearing broker 120 may monitor the distributed ledger 702 to determine that the investment manager 110 and/or the executing broker 150 has transferred the token to a burn address, and the line of credit represented by the token is sufficient to cover the cost of the trade, has not expired, and the clearing broker 120 provided the line of credit. Then in response to determining that the investment manager 110 and/or the executing broker 150 has transferred the token to a burn address, the clearing broker 120 settles the trade into an account for the investment manager 110.

In other implementations, the investment manager 110 and/or the executing broker 150 transfers the token to a smart contract. The smart contract may then determine whether the line of credit represented by the token has expired and whether the clearing broker 120 is the party that provided the line of credit. In response to determining that the line of credit has not expired and the clearing broker 120 is the party that provided the line of credit, the smart contract may automatically transfer the token to the clearing broker 120 or to a burn address. In some scenarios, the investment manager 110 may also provide an indication of the cost of the trade to the smart contract. The smart contract may then fractionalize the token by generating a number of fungible tokens each representing a fractional portion of the token. Then the smart contract may transfer an amount of the fungible tokens to the clearing broker 120 or the burn address which corresponds to the cost of the trade. The smart contract may also transfer the remaining amount of fungible tokens back to the investment manager 110 to use for subsequent trades.

When the executing broker 150 already received a fractional portion of the token from the investment manager 110 in the form of fungible tokens, the smart contract may transfer the fungible tokens to the clearing broker 120.

The smart contract may also set a flag indicating that the line of credit represented by the token is sufficient to cover the cost of the trade, has not expired, and the clearing broker 120 is the party that provided the line of credit. The clearing broker 120 may monitor the distributed ledger 702 to determine that the smart contract has set a flag indicating that the line of credit represented by the token is sufficient to cover the cost of the trade, has not expired, and the clearing broker 120 is the party that provided the line of credit. Then in response to identifying the flag set by the smart contract, the clearing broker 120 settles the trade into an account for the investment manager 110.

In some implementations, the clearing broker 120 transmits a transaction to the smart contract indicating that the clearing broker 120 has settled the trade. In response to receiving an indication that the clearing broker 120 has settled the trade, the smart contract transfers the token to the clearing broker 120 or to a burn address. Otherwise, the smart contract may transfer the token back to the investment manager 110 if the line of credit was not used to settle the trade.

If the clearing broker 120 does not receive a proof of the line of credit sufficient to cover the cost of the trade from the investment manager 110 and/or the executing broker 150, the clearing broker 120 may not settle the trade.

Figure 8:
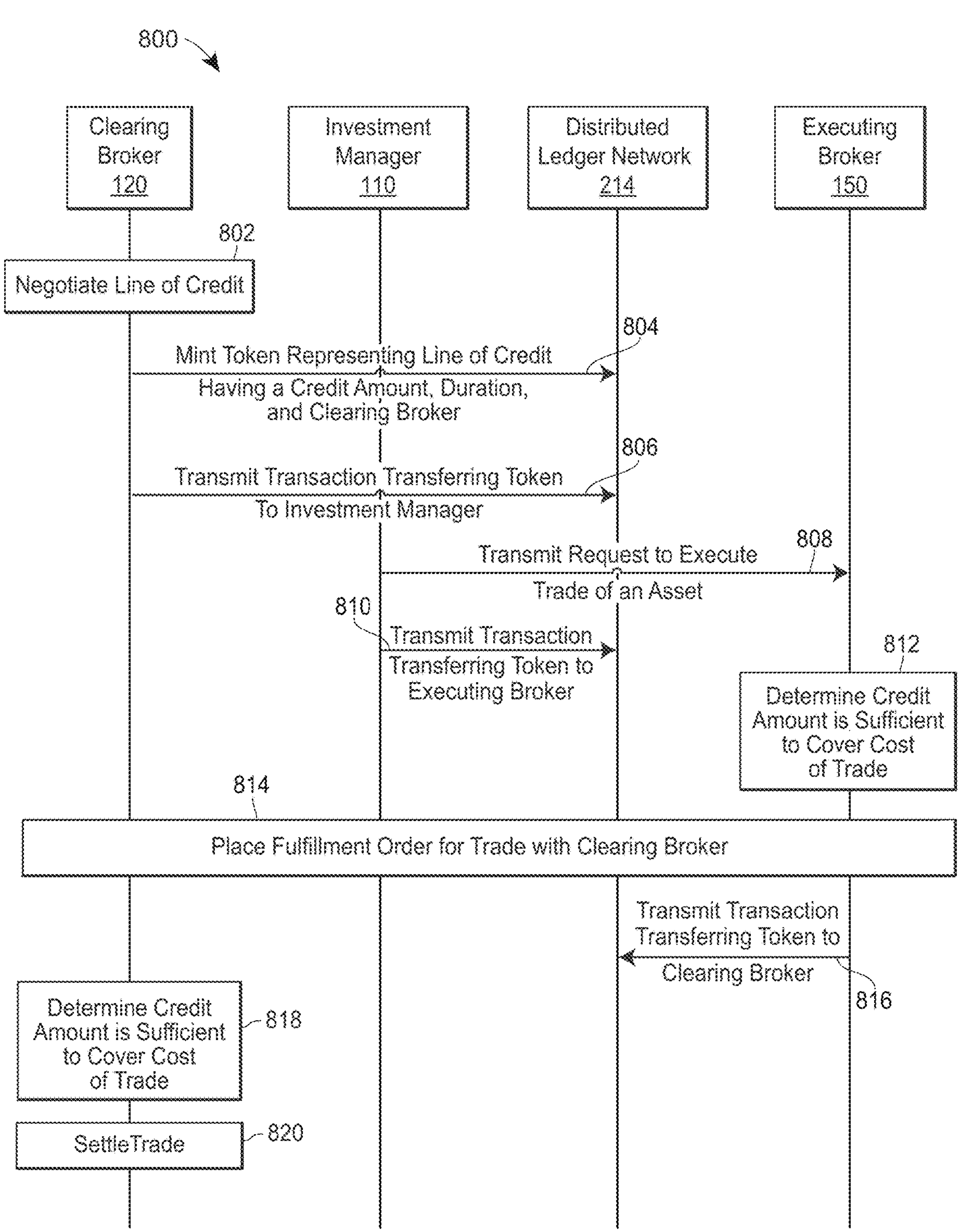
FIG. 8 illustrates an example message sequence diagram of an exemplary process flow for managing credit risk using a distributed ledger.

FIG. 8 illustrates an example message sequence diagram of an exemplary process flow 800 for managing credit risk using a distributed ledger 212. A clearing broker 120 and an investment manager 110 negotiate 802 a line of credit. For example, the clearing broker 120 may provide a line of credit to the investment manager 110 having a particular credit amount (e.g., $100), a particular duration (e.g., one week), and/or other terms and conditions of the line of credit (e.g., the line of credit is for the investment manager 110 only and is nontransferable, the line of credit is transferrable, a list of parties the line of credit can be transferred to, etc.).

Then the clearing broker 120 computing device mints 804 a token, via a distributed ledger 212, by broadcasting a transaction to validating nodes 102 in the distributed ledger network 214 to mint the token and including information describing the line of credit such as the name of the party providing the line of credit (e.g., Clearing Broker A), the amount of credit being provided, the duration of the line of credit before it expires, and/or other terms and conditions of the line of credit.

The token may be an NFT. To mint the NFT, the clearing broker 120 computing device may broadcast a transaction to a smart contract which calls a function of the smart contract for minting the NFT, and passes in information describing the line of credit to the function. The smart contract then generates a unique token identifier for the NFT and includes the information describing the line of credit as properties of the NFT.

The clearing broker 120 computing device may then generate and transmit 806 a transaction to at least one validating node 102 in the distributed ledger network 214 to transfer the token to the investment manager 110. For example, the transaction may include the smart contract address for the smart contract that minted the NFT, the unique token identifier for the NFT, a distributed ledger address for the investment manager 110, and a cryptographic proof-of-identity and distributed ledger address for the clearing broker 120.

The investment manager 110 computing device may transmit 808 a request to the executing broker 150 computing device to trade an asset on behalf of the investment manager 110. Additionally, the investment manager 110 computing device may generate and transmit 810 a transaction to at least one validating node 102 in the distributed ledger network 214 to transfer the token to the executing broker 150 as proof of a line of credit from the clearing broker 120. As mentioned above, in other implementations, the investment manager 110 computing device transmits a transaction to transfer the token to a burn address or to a smart contract to fractionalize the token and transfer a fractional portion of the token to the executing broker 150 or the burn address that is sufficient to cover the cost of the trade.

The executing broker 150 then determines 812 whether the credit amount represented by the token or the fractional portion of the token is sufficient to cover the cost of the trade and/or whether the token has expired. In some implementations, a smart contract determines whether the credit amount represented by the token or the fractional portion of the token is sufficient to cover the cost of the trade and/or whether the token has expired. Then the smart contract sets a flag indicating that the line of credit represented by the token is sufficient to cover the cost of the trade and has not expired. The executing broker 150 monitors the distributed ledger 212 to determine that the smart contract has set the flag.

In response to determining that the credit amount represented by the token or the fractional portion of the token is sufficient to cover the cost of the trade, and the token has not expired, the executing broker 150 places 814 a fulfillment order with a clearing broker 120 that has a clearing agreement with the investment manager 110 and is the party providing the line of credit.

The executing broker 150 computing device may generate and transmit 816 a transaction to at least one validating node 102 in the distributed ledger network 214 to transfer the token to the clearing broker 120 as proof of a line of credit from the clearing broker 120. As mentioned above, in other implementations, the investment manager 110 computing device and/or the executing broker 150 computing device transmits a transaction to transfer the token to a burn address or to a smart contract to fractionalize the token and transfer a fractional portion of the token to the clearing broker 120 or the burn address that is sufficient to cover the cost of the trade.

The clearing broker 120 then determines 818 whether the credit amount represented by the token or the fractional portion of the token is sufficient to cover the cost of the trade, whether the token has expired, and/or whether the clearing broker 120 is the party that provided the line of credit. In some implementations, a smart contract determines whether the credit amount represented by the token or the fractional portion of the token is sufficient to cover the cost of the trade, whether the token has expired, and/or whether the clearing broker 120 is the party that provided the line of credit. Then the smart contract sets a flag indicating that the line of credit represented by the token is sufficient to cover the cost of the trade, the line of credit has not expired, and the clearing broker 120 is the party that provided the line of credit. The clearing broker 120 monitors the distributed ledger 212 to determine that the smart contract has set the flag.

In response to determining that the credit amount represented by the token or the fractional portion of the token is sufficient to cover the cost of the trade, the token has not expired and the clearing broker 120 is the party that provided the line of credit, the clearing broker 120 settles 820 the trade into an account for the investment manager 110.

In some implementations, only one of the executing broker 150 and the clearing broker 120 determines 812, 818 whether the credit amount represented by the token or the fractional portion of the token is sufficient to cover the cost of the trade, whether the token has expired, and/or whether the clearing broker 120 is the party that provided the line of credit. In this manner, the clearing broker 120 cannot refuse to settle the trade if the executing broker 150 places a fulfillment order, and/or if either the executing broker 150 or the clearing broker 120 determines 812, 818 that the credit amount represented by the token or the fractional portion of the token is sufficient to cover the cost of the trade, the token has not expired, and/or the clearing broker 120 is the party that provided the line of credit.

In these implementations, the investment manager 110 computing device may generate and transmit 810 a transaction to at least one validating node 102 in the distributed ledger network 214 to transfer the token directly to the clearing broker 120 as proof of a line of credit from the clearing broker 120, rather than transferring the token to the executing broker 150 which transfers the token to the clearing broker 120.

This detailed description is to be construed as exemplary only and does not describe every possible embodiment, as describing every possible embodiment would be impractical, if not impossible. One may implement numerous alternate embodiments, using either current technology or technology developed after the filing date of this application.

Although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a business or home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112 (f) unless traditional means-plus-function language is expressly recited, such as "means for" or "step for" language being explicitly recited in the claim(s).

What is claimed:

1. A method for verifying credit of an investment manager using a distributed ledger maintained by a plurality of participants, the method comprising:

receiving, at one or more processors of an executing broker from an investment manager, a request to execute a trade of an asset;

monitoring, by the one or more processors, a distributed ledger maintained by a plurality of participants in a distributed ledger network for a token minted by a clearing broker to the investment manager representing a line of credit provided by the clearing broker, the token including a credit amount, a name of the clearing broker providing the line of credit, and a duration;

in response to (i) identifying the token representing the line of credit provided by the clearing broker to the investment manager, (ii) receiving the token, (iii) determining that the name included in the token matches the name of the clearing broker, (iv) determining that the credit amount is sufficient to cover a cost of the trade, and (v) determining that the token has not expired, placing, by the one or more processors, a fulfillment order for the trade by the investment manager, such that the clearing broker settles the trade; and burning, by the one or more processors, the token by transmitting the token to a burn address including augmenting a transaction to transfer the token to the burn address with a cryptographic signature from the executing broker according to a private cryptographic key owned by the executing broker to prove an identity of the executing broker.

2. The method of claim 1, wherein the line of credit is for particular amount and for a particular duration.

3. The method of claim 1, further comprising:

monitoring, by the one or more processors, the distributed ledger for a transfer of the token to the executing broker.

4. The method of claim 1, further comprising:

transmitting, by the one or more processors, a request to the clearing broker to settle the trade, wherein the clearing broker settles the trade in response to determining that the token has been burned.

5. The method of claim 1, wherein the token is a non-fungible token (NFT).

6. The method of claim 5, wherein the token is a fractionalizable NFT configured to be fractionalized into fungible tokens, and receiving the token includes:

receiving a number of the fungible tokens corresponding to the cost of the trade, wherein each fungible token represents a fractional portion of the credit amount for the fractionalizable NFT.

7. The method of claim 6, wherein determining that the credit amount is sufficient to cover the cost of the trade includes determining that the fractional portion of the credit amount corresponding to the number of fungible tokens received is sufficient to cover the cost of the trade.

8. A computing device for verifying credit of an investment manager using a distributed ledger maintained by a plurality of participants, the computing device comprising:

one or more processors; and a non-transitory computer-readable medium coupled to the one or more processors and storing instructions thereon, that when executed by the one or more processors, cause the computing device to:

receive, at an executing broker from an investment manager, a request to execute a trade of an asset;

monitor a distributed ledger maintained by a plurality of participants in a distributed ledger network for a token minted by a clearing broker to the investment manager representing a line of credit provided by the clearing broker, the token including a credit amount, a name of the clearing broker providing the line of credit, and a duration;

in response to (i) identifying the token representing the line of credit provided by the clearing broker to the investment manager, (ii) receiving the token, (iii) determining that the name included in the token matches the name of the clearing broker, (iv) determining that the credit amount is sufficient to cover a cost of the trade, and (v) determining that the token has not expired, place a fulfillment order for the trade by the investment manager, such that the clearing broker settles the trade; and burn transmit the token by transmitting the token to a burn address to burn the token including augmenting a transaction to transfer the token to the burn address with a cryptographic signature from the executing broker according to a private cryptographic key owned by the executing broker to prove an identity of the executing broker.

9. The computing device of claim 8, wherein the line of credit is for particular amount and for a particular duration.

10. The computing device of claim 8, wherein the instructions further cause the computing device to:

monitor the distributed ledger for a transfer of the token to the executing broker.

11. The computing device of claim 8, wherein the instructions further cause the computing device to:

transmit a request to the clearing broker to settle the trade, wherein the clearing broker settles the trade in response to determining that the token has been burned.

12. The computing device of claim 8, wherein the token is a non-fungible token (NFT).

13. The computing device of claim 12, wherein the token is a fractionalizable NFT configured to be fractionalized into fungible tokens, and receiving the token includes:

receiving a number of the fungible tokens corresponding to the cost of the trade, wherein each fungible token represents a fractional portion of the credit amount for the fractionalizable NFT.

14. The computing device of claim 13, wherein to determine that the credit amount is sufficient to cover the cost of the trade, the instructions cause the computing device to determine that the fractional portion of the credit amount corresponding to the number of fungible tokens received is sufficient to cover the cost of the trade.

15. A non-transitory computer-readable medium coupled to one or more processors and storing instructions thereon, that when executed by the one or more processors, cause the one or more processors to:

receive, at an executing broker from an investment manager, a request to execute a trade of an asset;

monitor a distributed ledger maintained by a plurality of participants in a distributed ledger network for a token minted by a clearing broker to the investment manager representing a line of credit provided by the clearing broker, the token including a credit amount, a name of the clearing broker providing the line of credit, and a duration;

in response to (i) identifying the token representing the line of credit provided by the clearing broker to the investment manager, (ii) receiving the token, (iii) determining that the name included in the token matches the name of the clearing broker, (iv) determining that the credit amount is sufficient to cover a cost of the trade, and (v) determining that the token has not expired, place a fulfillment order for the trade by the investment manager, such that the clearing broker settles the trade; and burn the token by transmitting the token to a burn address to burn the token including augmenting a transaction to transfer the token to the burn address with a cryptographic signature from the executing broker according to a private cryptographic key owned by the executing broker to prove an identity of the executing broker.

16. The non-transitory computer-readable medium of claim 15, wherein the line of credit is for particular amount and for a particular duration.

17. The non-transitory computer-readable medium of claim 15, wherein the instructions further cause the one or more processors to:

monitor the distributed ledger for a transfer of the token to the executing broker.

18. The non-transitory computer-readable medium of claim 15, wherein the instructions further cause the one or more processors to:

transmit a request to the clearing broker to settle the trade, wherein the clearing broker settles the trade in response to determining that the token has been burned.

* * * * *